(12) United States Patent
Hartono et al.

(10) Patent No.: US 9,921,832 B2
(45) Date of Patent: Mar. 20, 2018

(54) INSTRUCTION TO REDUCE ELEMENTS IN A VECTOR REGISTER WITH STRIDED ACCESS PATTERN

(71) Applicant: Intel Corporation, Santa Clara, CA (US)

(72) Inventors: Albert Hartono, Santa Clara, CA (US); Jayashankar Bharadwaj, Saratoga, CA (US); Nalini Vasudevan, Sunnyvale, CA (US); Sara S. Baghsorkhi, San Jose, CA (US); Victor W. Lee, Santa Clara, CA (US); Daehyun Kim, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 477 days.

(21) Appl. No.: 13/993,653

(22) PCT Filed: Dec. 28, 2012

(86) PCT No.: PCT/US2012/072119
§ 371 (c)(1),
(2) Date: Jun. 12, 2013

(87) PCT Pub. No.: WO2014/105057
PCT Pub. Date: Jul. 3, 2014

(65) Prior Publication Data
US 2014/0189288 A1    Jul. 3, 2014

(51) Int. Cl.
*G06F 9/30* (2006.01)
(52) U.S. Cl.
CPC ........ *G06F 9/30036* (2013.01); *G06F 9/3001* (2013.01); *G06F 9/30018* (2013.01); *G06F 9/30065* (2013.01)

(58) Field of Classification Search
CPC .................... G06F 9/30036; G06F 9/30065
See application file for complete search history.

(56) References Cited

U.S. PATENT DOCUMENTS 5,727,229 A    3/1998  Kan et al.
6,016,395 A    1/2000  Mohamed
(Continued)

FOREIGN PATENT DOCUMENTS

CN    101398753 A    4/2009
CN    101436121 A    5/2009

OTHER PUBLICATIONS

Notification of Transmittal of the International Search Report and the Written Opinion or the International Searching Authority, or the Declaration for PCT Counterpart Application No. PCT/2012/072119, 11 pgs., (dated Aug. 1, 2013).
(Continued)

*Primary Examiner* — Keith Vicary
(74) *Attorney, Agent, or Firm* — Nicholson De Vos Webster & Elliott, LLP

(57) ABSTRACT

A vector reduction instruction with non-unit strided access pattern is received and executed by the execution circuitry of a processor. In response to the instruction, the execution circuitry performs an associative reduction operation on data elements of a first vector register. Based on values of the mask register and a current element position being processed, the execution circuitry sequentially sets one or more data elements of the first vector register to a result, which is generated by the associative reduction operation applied to both a previous data element of the first vector register and a data element of a third vector register. The previous data element is located more than one element position away from the current element position.

17 Claims, 12 Drawing Sheets

(56) References Cited

U.S. PATENT DOCUMENTS

| | | |
|---|---|---|
| 7,661,105 B2 | 2/2010 | Watt et al. |
| 8,271,832 B2 | 9/2012 | Gonion et al. |
| 8,458,539 B2 | 6/2013 | Kurts et al. |
| 2004/0044882 A1 | 3/2004 | Asaad et al. |
| 2010/0049950 A1* | 2/2010 | Gonion ............. G06F 8/4441 712/222 |
| 2011/0320893 A1 | 12/2011 | Kurts et al. |

OTHER PUBLICATIONS

Notice of Final Rejection from foreign counterpart Korean Patent Application No. 10-2015-7012922, dated Mar. 30, 2017, 7 pages.
International Preliminary Report on Patentability for International Application No. PCT/2012/072119, dated Jun. 30, 2015, 5 pages.
Office Action for counterpart Korean Application No. 10-2015-7012922, dated Sep. 12, 2016, with English-language translation, 11 pages.
First Office Action and Search Report from foreign counterpart Chinese Patent Application No. 201280077375.7, dated Sep. 1, 2017, 15 pages.

* cited by examiner

```
vRunningAddWithStride v1, k1, v2, v3, 3
```

```
Inputs: v1:   d     e     f     g     h  |  a     b     c
        v2:   p     q     r     s     t  |  u     v     w
        v3:   2     2     2     2     2  |  2     2     2
        k1:   1     1     1     1     1  |  1     1     1

Output: v1: a+2   b+2   c+2   a+4   b+4 | c+4   a+6   b+6
```

FIG. 2A

```
vRunningAddWithStride v1, k1, v2, v3, 3
```

```
Inputs: v1:   d     e     f     g     h  |  a     b     c
        v2:   p     q     r     s     t  |  u     v     w
        v3:   2     2     2     2     2  |  2     2     2
        k1:   0     0     0     0     0  |  0     0     0

Output: v1: [ d ] [ e ] [ f ] [ g ] [ h ]|[ u ] [ v ] [ w ]
```

FIG. 2B

```
vRunningAddWithStride v1, k1, v2, v3, 3
```

```
Inputs: v1:   d     e     f     g     h  |  a     b     c
        v2:   p     q     r     s     t  |  u     v     w
        v3:   2     2     2     2     2  |  2     2     2
        k1:   1     0     1     0     1  |  0     1     0

Output: v1: a+2  [ e ] c+2  [ g ] e+2 |[ u ] g+2  [ w ]
```

FIG. 2C

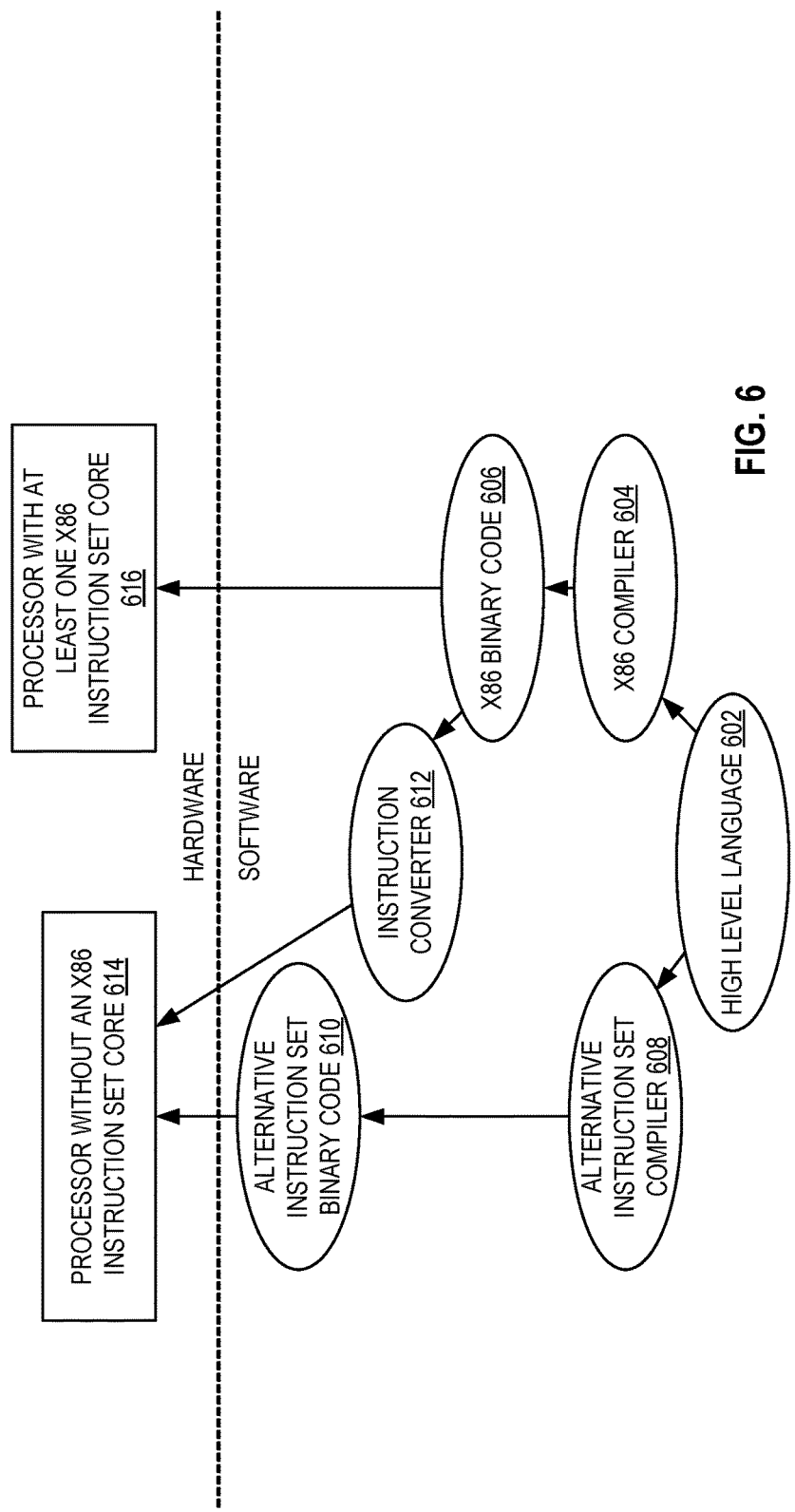

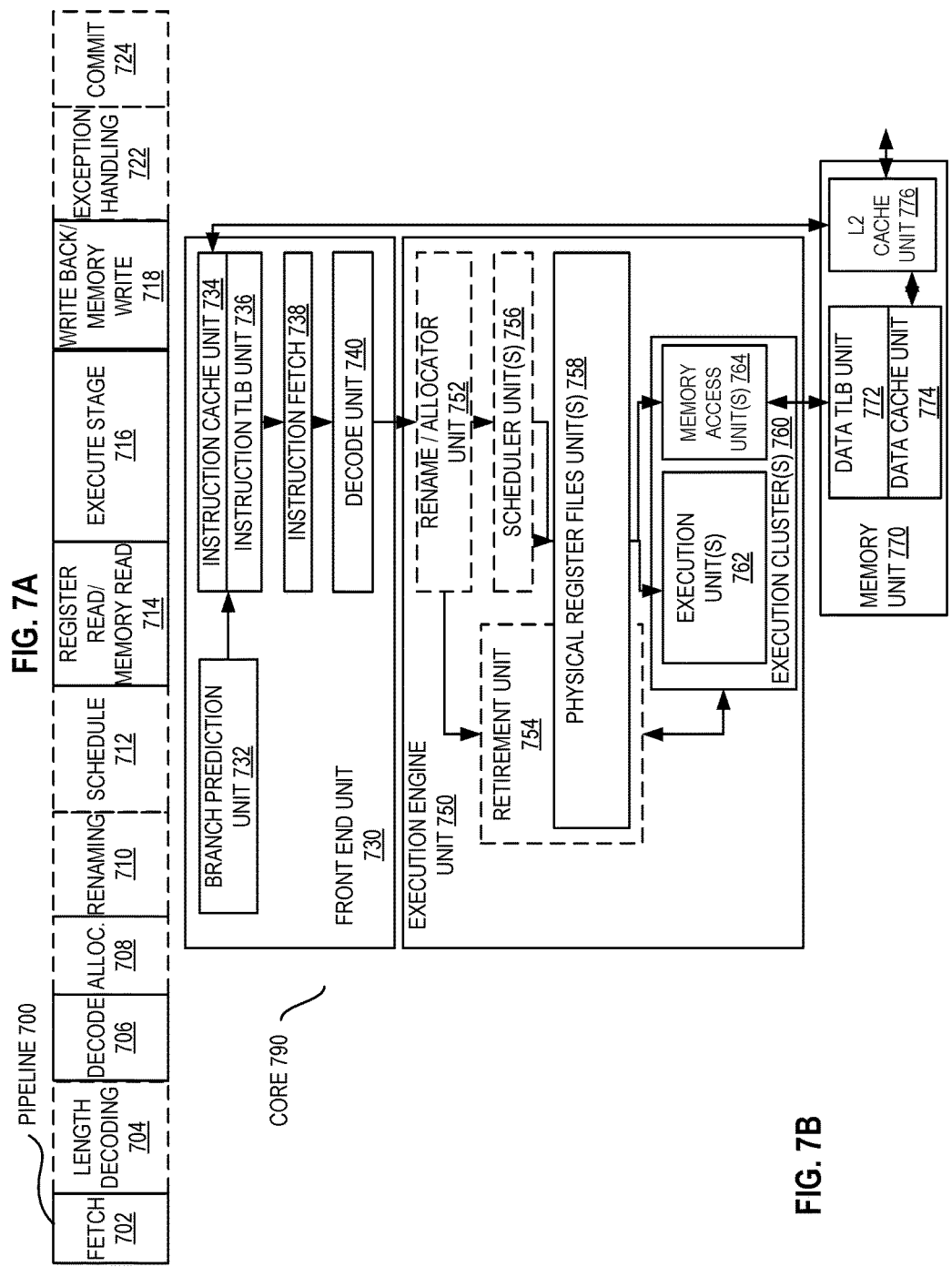

US 9,921,832 B2

INSTRUCTION TO REDUCE ELEMENTS IN A VECTOR REGISTER WITH STRIDED ACCESS PATTERN

CROSS-REFERENCE TO RELATED APPLICATION

This patent application is a U.S. National Phase Application under 35 U.S.C. § 371 of International Application No. PCT/US2012/072119, filed Dec. 28, 2012, entitled INSTRUCTION TO REDUCE ELEMENTS IN A VECTOR REGISTER WITH STRIDED ACCESS PATTERN.

TECHNICAL FIELD

The present disclosure pertains to the field of processing logic, microprocessors, and associated instruction set architecture that, when executed by the processor processing logic, perform logical, mathematical, or other functional operations.

BACKGROUND ART

An instruction set, or instruction set architecture (ISA), is the part of the computer architecture related to programming, and may include the native data types, instructions, register architecture, addressing modes, memory architecture, interrupt and exception handling, and external input and output (I/O). The term instruction generally refers herein to macro-instructions—that is instructions that are provided to the processor (or instruction converter that translates (e.g., using static binary translation, dynamic binary translation including dynamic compilation), morphs, emulates, or otherwise converts an instruction to one or more other instructions to be processed by the processor) for execution—as opposed to micro-instructions or micro-operations (micro-ops)—that is the result of a processor's decoder decoding macro-instructions.

The ISA is distinguished from the micro-architecture, which is the internal design of the processor implementing the instruction set. Processors with different micro-architectures can share a common instruction set. For example, Intel® Core™ processors and processors from Advanced Micro Devices, Inc. of Sunnyvale Calif. implement nearly identical versions of the x86 instruction set (with some extensions that have been added with newer versions), but have different internal designs. For example, the same register architecture of the ISA may be implemented in different ways in different micro-architectures using well-known techniques, including dedicated physical registers, one or more dynamically allocated physical registers using a register renaming mechanism, etc.

Many modern ISAs support Single Instruction, Multiple Data (SIMD) operations. Instead of a scalar instruction operating on only one data element or pair of data elements, a vector instruction (also referred to as a packed data instruction or SIMD instruction) may operate on multiple data elements or multiple pairs of data elements simultaneously or in parallel. The processor may have parallel execution hardware responsive to the vector instruction to perform the multiple operations simultaneously or in parallel.

A SIMD operation operates on multiple data elements packed within one register or memory location in one operation. These data elements are referred to as packed data or vector data. Each of the vector data elements may represent a separate individual piece of data (e.g., a color of a pixel, etc.) that may be operated upon separately or independently of the others. SIMD architectures rely on the compiler to vectorize loops for performance. Loops that perform various forms of associative reduction operations (e.g., additions, multiplications, logical operations, etc.) are commonly found in general-purpose applications, system software as well as in floating point intensive and multimedia applications. The reduction operations may be executed conditionally or unconditionally, over a scalar or an array with a unit strided or a non-unit strided access pattern. Array reduction loops with an access stride distance that is less than the vector length cannot be vectorized by current compilers due to the presence of lexically-backward loop-carried flow dependency.

Existing instructions do not encapsulate associative array reduction operations with a non-unit stride, and do not encapsulate associative array reduction operations with unit stride that is executed conditionally. The limitations of the existing instructions prevent vectorization of certain types of reduction loops and, consequently, can result in loss of performance.

BRIEF DESCRIPTION OF THE DRAWINGS

Embodiments are illustrated by way of example and not limitation in Figures of the accompanying drawings:

FIGS. 2A-2C illustrate further examples of the vector reduction instruction according to one embodiment.

FIG. 6 is a block diagram illustrating the use of a software instruction converter to convert binary instructions in a source instruction set to binary instructions in a target instruction set according to one embodiment.

FIG. 7A is a block diagram of an in-order and out-of-order pipeline according to one embodiment.

FIG. 7B is a block diagram of an in-order and out-of-order core according to one embodiment.

DESCRIPTION OF THE EMBODIMENTS

Figure 1:
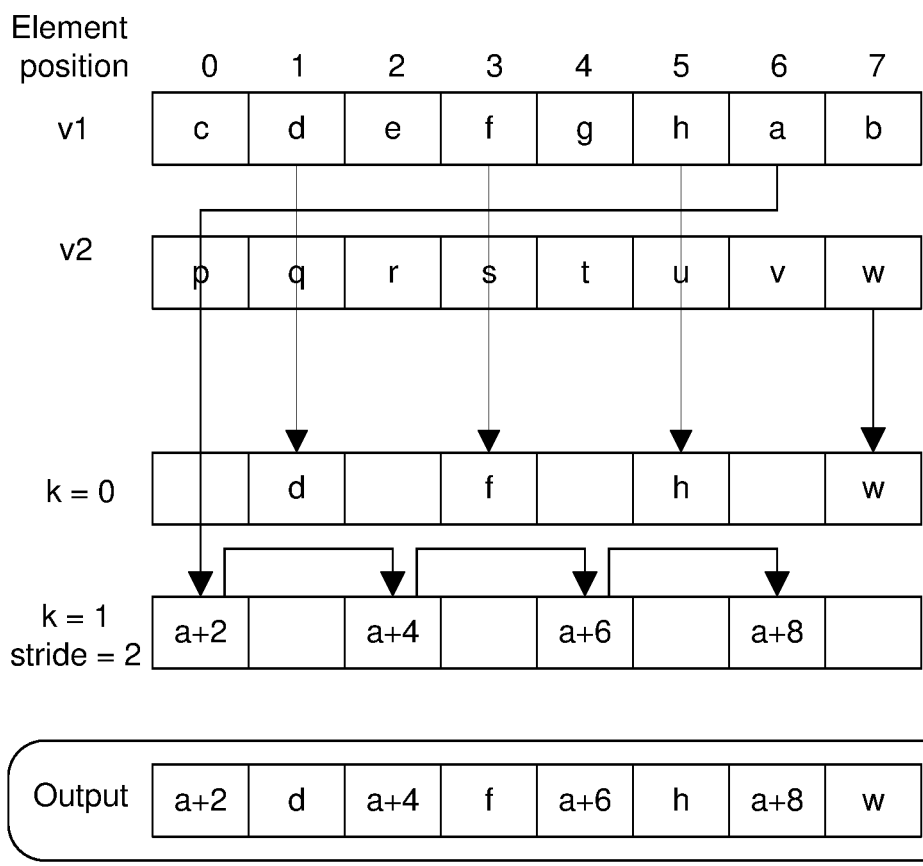
FIG. 1 illustrates an example of a vector reduction instruction according to one embodiment.

In the following description, numerous specific details are set forth. However, it is understood that embodiments of the invention may be practiced without these specific details. In other instances, well-known circuits, structures and techniques have not been shown in detail in order not to obscure the understanding of this description.

Embodiments described herein provide a class of new instructions (also referred to as "vector reduction instructions") that perform associative reduction operations where data dependencies within a vector register exist. The data dependency distance (also referred to as "stride distance") is a positive integer that may be greater than one. A greater-than-one stride distance is referred to herein as a "non-unit" stride distance. The non-unit stride distance is specified as input for the vector reduction instructions, and is used for computing potentially interdependent reduction results. Additionally, the vector reduction instructions allow associative reduction operations to be performed conditionally and correctly, which is an improvement over the existing hardware reduction techniques that use a value propagation approach. The value propagation approach generally prohibits vectorization of predicated array reduction. Therefore, embodiments described herein have the potential of enhancing performance in a wider range of associative reduction loops.

The vector reduction instructions enable expression of commonly-used associative reduction operations that may be executed conditionally on an array of data element. The vector reduction instructions are also applicable to reduction operations with a non-unit strided memory reference pattern. The vector reduction instructions provide the compiler the ability to vectorize various types of associative reduction loops.

The following is an example of a loop being executed, where the stride distance is one:

```
for (i = 0; i < N; i++) {
    if (A[i] != 0)
        B[i] = B[i-1] + X;
}
```

Table 1 shows the input and output data values of the loop execution. In the example of Table 1, a reduction operation is performed on each enabled element by first reading the preceding element value and then adding it with the second addition operand value (i.e., X). In Table 1, each column indicates one iteration of the loop, and B[i] in the last row indicates the output result:

TABLE 1

| | i | | | | | | | |
|---|---|---|---|---|---|---|---|---|
| | 0 | 1 | 2 | 3 | 4 | 5 | 6 | 7 |
| B[i] | b | c | d | e | f | g | h | i |
| X | 2 | 2 | 2 | 2 | 2 | 2 | 2 | 2 |
| A[i] | 0 | 1 | 0 | 0 | 1 | 1 | 0 | 1 |
| B[i] result | b | b + 2 | d | e | e + 2 | e + 4 | h | h + 2 |

Embodiments described herein not only correctly and efficiently generate the result as shown in Table 1 for unit stride scenarios, but can also correctly and efficiently generate results for non-unit stride scenarios. An example of a loop with a non-unit stride is as follows where the stride distance (i1) may be greater than one.

```
for (i = s; i < N; i++) {
    if (A[i] != 0)
        B[i] = B[i-i1] + B[i];
}
```

The reduction operation is guarded by a condition (A[i]!=0) to calculate cumulative sums of array B with a constant stride length of s. For example, assume that all of the elements of array A are non-zeros (i.e., the if-statement becomes unconditional), and array B={a, b, c, d, e, f, g, h}. The cumulative sums of array B with a stride distance of two are {a, b, a+c, b+d, a+c+e, b+d+f, a+c+e+g, b+d+f+h}. A compiler cannot vectorize this loop because of the lexically-backward cross-iteration flow dependence from the write to B[i] to the read from B[i−11]. Having the vector reduction instructions that allow mapping of such class of associative reduction operation is useful for performance.

According to embodiments of the invention, the new vector reduction instructions for additive reduction are: vRunningAddWithStride[BWDQ] v1, k1, v2, v3, i1 (where [BWDQ] indicates the types of the vector elements as byte/word/dword/qword/float/double; or more specifically: a byte, a word, a doubleword, a quadword, a floating point number, or a double-precision floating point number). The vector reduction instructions may specify other associative reduction operations (some of which may also be commutative) that include multiply, bit-wise AND, bit-wise OR, MIN, MAX, as well as other arithmetic or logical operators.

The vector reduction instructions take a predicate mask input (k1) as input. In one embodiment, the predicate mask is stored in a mask register that includes one mask bit to guard the execution of an associative reduction operation for a pair of source data elements. In one embodiment, a mask bit value of one defines a "true" condition, which allows the associative reduction operation to proceed or allows its result to be stored. A mask bit value of zero defines a "false" condition, which disallows the associative reduction operation to proceed or disallows its result to be stored. Thus, a source data element which is controlled by a mask bit of one is "enabled" to take part in the associative reduction operation while a source data element which is controlled by a mask bit of zero is "disabled." In an alternative embodiment, the definitions of true and false may be reversed with respect to the mask bit values of one and zero. In yet another embodiment, each predicate mask in the mask register may be more than one bit.

In addition to the predicate mask input (k1) that guards the execution of the associative reduction operation, the vector reduction instructions also take as input the stride distance value (i1), which is a positive integer. This instruction updates the destination vector v1 by performing a "strided" vector additive reduction on data elements in v1 with addition operands in v3, using a stride distance of i1. Data elements disabled by the predicate mask k1 do not take part in the reduction. The last i1 elements of the source vector v2 that are disabled by mask k1 are copied to v1.

FIG. 1 illustrates an example of a new vector reduction instruction vRunningAddWithStride according to one embodiment. The instruction has source operands including a first vector register v1, a second vector register v2, a third vector register v3, a mask register k1, and a stride distance of 2. The first vector register v1 is both a source operand and a destination operand. Although a total of 8 data elements are shown in each of the vector registers, it is understood that each vector register may include any number of data elements. Moreover, each data element may be a byte, a word, a dword, a qword, a floating point number, or a double-precision floating point number.

In the example of FIG. 1, element positions 1, 3, 5 and 7 are disabled by the corresponding mask register value (where the mask value is false, as indicated by a zero in this example). Output data elements located in the disabled element positions are shown in square outlines. As the stride distance is 2, only the last two data elements of the source vector v2 are candidates for being copied into the corresponding element positions of v1. As k1[6] is true and k1[7] is false, only v2[7] is copied to v1[7]. There is no change to the values of v1[1], v1[3] and v1[5].

On the other hand, element positions 0, 2, 4 and 6 are enabled by the corresponding mask register value (where the mask value is true, as indicated by a one in this example). For each data element of v1 in these positions, an addition operation is performed on a previous data element of v1 and a data element of v3 in the current element position. In this example, each data element of v3 is a constant value of 2. The location of the previous data element is the current element position minus the stride distance modulo the vector length VL (which is 8 in this example). For v1[0], its previous data element is v1[6], which can be calculated by (current element position stride distance) AND (VL−1), where AND represents the bitwise AND operator. A vertical dotted line is shown to separate the wrapped around portion of the data elements.

As shown in the example, the addition operation is applied to the data element of v1 selectively, as only those data elements enabled by the corresponding mask values receive the addition operation. Further, the addition operation is applied sequentially to each data element of v1. Thus, the resulting v1[2] is the sum of v1[0] plus v3[2], after v1[0] has been processed by a previous addition operation and its value has been updated to (a+2). Similarly for v1[4] and v1[6], each of these data elements is equal to the sum of a previous data element of v1 plus a corresponding element of v3, after that previous data element has been processed and updated by a previous addition operation.

An example of the pseudocode for the vector instruction vRunningAddWithStride is described in the following. In this example, VL is the vector length, which is 8 for Q (qword), 16 for D (dword), 32 for W (word) and 64 for B (byte).

```
vRunningAddWithStride(v1, k1, v2, v3, i1) {
  int j, prev_j;
  for (j = 0; j < VL; j++) {
    if (k1[j]) {
      prev_j = (j−i1) & (VL−1); // Wrap around the vector when
                                 (j−i1) < 0.
      v1[j] = v1[prev_j] + v3[j];
    }
  }
  for (j = (VL−i1); j < VL; j++) {
    if (! k1[j])
      v1[j] = v2[j];
  }
}
```

It is noted that when the stride distance is greater than or equal to the vector length (VL), the new reduction add instruction behaves in the same way as a regular vector addition, where there is no pre-computed partial sum used by its subsequent partial sums. That is, no dependencies exist within the vector register in this scenario.

FIGS. 2A-2C illustrate three examples of the new reduction add instruction with a stride distance of 3. Similar to the example of FIG. 1, the instruction has source operands including a first vector register v1, a second vector register v2, a third vector register v3, a mask register k1, and a stride distance of 3. The first vector register v1 is both a source operand and a destination operand. In the example of FIG. 2A, all of the data elements in the mask register k1 are ones (true). Therefore, each data element of resulting v1 is the previous data element of v1 (which is three strides away from the current element position modulo the vector length) plus the data element of v3 in the current element position. For example, v1[0]−v1[5]+v3[0], v1[3]=v1[0]+v3[3], etc. As described above the v1[0] that is used in the sum of v1[3] is the updated v1[0]−a+2 (not the original v1[0]=d). In the example of FIG. 2B, all of the data elements in the mask register k1 are zeros (false). Therefore, the first 5 data elements of resulting v1 are unchanged front their respective original values (as VL−stride distance=8−3=5). The last 3 data elements (where 3=stride distance) of v1 are copied from the data elements of v2 in the corresponding element positions. In the example of FIG. 2C, data elements of positions 1, 3, 5 and 7 are disabled by a mask value of zero: thus, v1[1] and v[3] keep their respective original values (as they are among the first 5 data elements of v1), and v1[5] and v1[7] have the values copied from v2[5] and v2[7] (as they are among the last 3 data elements of v1). Data elements of positions 0, 2, 4 and 6 are enabled by a mask value of one: thus, each of the resulting v1 in these positions is a sum of a previous data element and the corresponding v3 in these positions. The previous data element in this example is located 3 element positions (with wrap-around) prior to the element position currently being processed.

An example of using the new instruction is shown in the following additive reduction loop:

```
for (i=3; i<N; i++) {
  if (A[i] != 0)
    B[i] = B[i−3] + 2;
    C[i] = B[i];    // Store the partial reduction results to C.
}
```

Figures 3, 5:
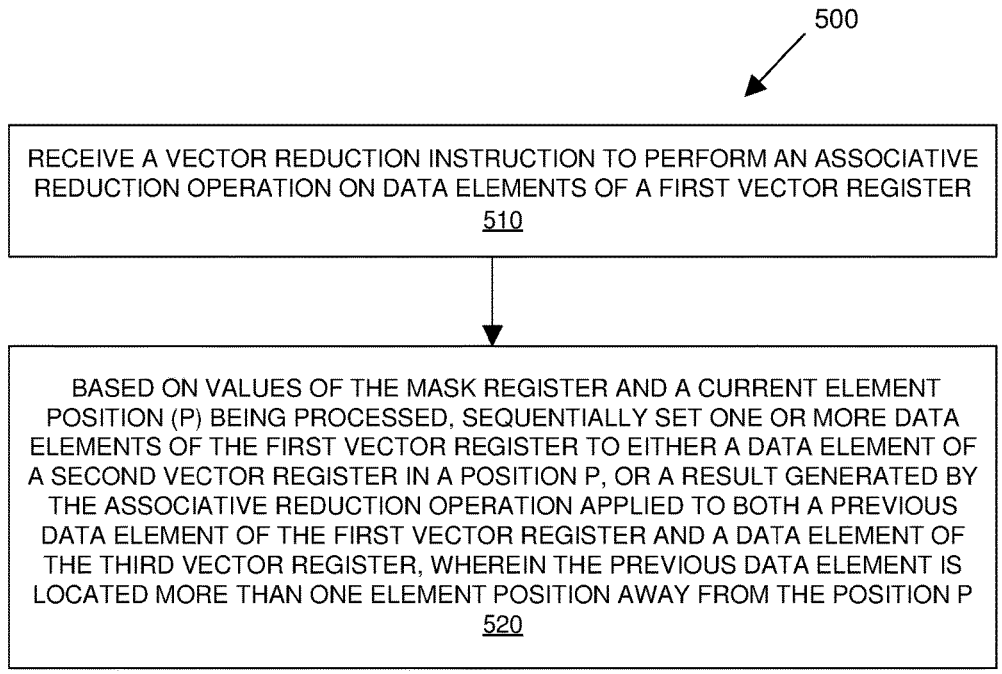
FIG. 3 illustrates an example of applying the vector reduction operation on two different shifted versions of a vector according to one embodiment.
FIG. 5 is a flow diagram illustrating operations to be performed responsive to the vector reduction instruction according to one embodiment.

With the given semantics of the new vector reduction instruction, the input and output data in the first vector iteration of the above loop are shown in FIG. 3, assuming that VL=8. In this example, the stride distance is 3. The first 8 data elements of B, after being left-shifted by 3 positions (with wrap-around), are loaded into v1. That is, v1=B[3:7, 0:2]. The left-shifted B (without wrap-around) by 3 positions, which is B[3:10], is loaded into v2. The mask register k1 is set according to A[i], and v3 contains an array of integer addends of 2. The reduction loop in this example can be vectorized using the following sequence of vector instructions:

```
k_first5 = 0xFF >> 3;    // Mask to load the first 5 elements only.
v1_post[VL−3:VL−1] = B[0:2];    // Initialize the last 3 elements only.
v3 = Broadcast(2);    // Addend.
i = 3;
loop:
  k_if = (A[i:i+VL−1] != 0);
  v1_post = MaskedLoad(&B[i], k_first5); // Load first 5 elements from
  B[i:i+VL−1].
                // The last 3 elements are retained from previous iteration.
  v2 = MaskedLoad(&B[i], !k_first5);    // Load last 3 elements from
  B[i:i+VL−1].
                // The first 5 elements are not used here and thus ignored.
  v1_post = vRunningAddWithStride(v1_post, k_if, v2, v3, 3);
  MaskedStore(k_if, v1_post, &B[i]);
  Store(v1_post, &C[i]);    // Store the partial reduction results to C.
  i += VL;
  if (i <= N−VL) goto loop;
```

Figure 4:
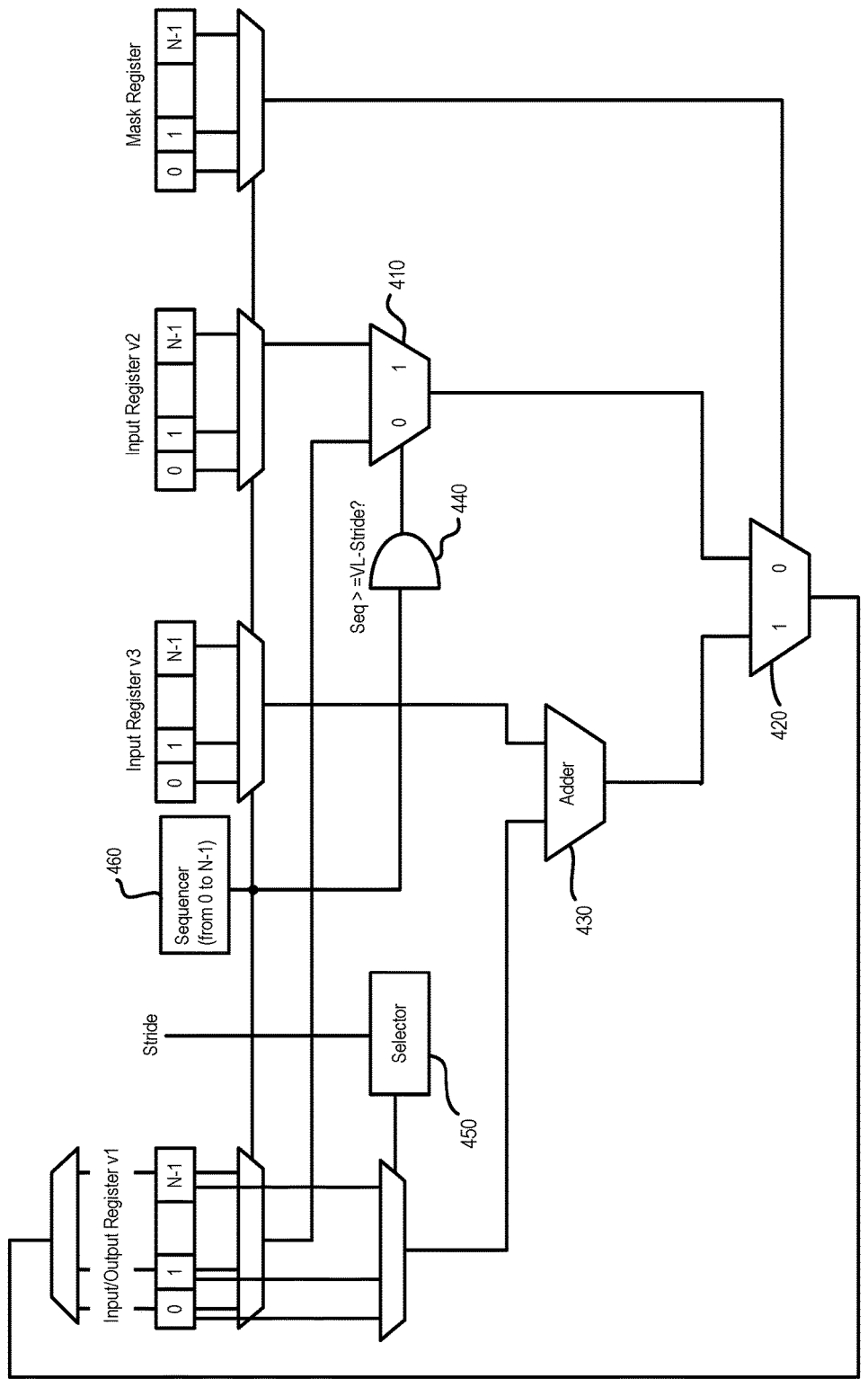
FIG. 4 is a block diagram illustrating a hardware unit for performing the vector reduction operation according to one embodiment.

FIG. 4 is a block diagram of an embodiment of a hardware unit that performs the vector reduction instruction vRunningAddWithStride. The source operands can be loaded into the input vector registers v1, v2 and v3, and the mask register k1. The stride distance ("stride") is input to a selector 450, and the loop index is generated by a sequencer 460. The output of the sequencer 460 is the loop index and is indicated as seq. The selector 450 implements the logic of (seq-stride) & (VL−1) to determine the previous data element of v1. A comparator 440 determines whether the sequencer output (seq) is greater than or equal to (VL-stride), and uses the result of the comparison to control a multiplexer 410. If the sequencer output is greater than or equal to (VL-stride), the data element of v2 for the current loop index is selected. If the sequencer output is not greater than or equal to (VL-stride), the data element of v1 for the current loop index is selected. The hardware unit also includes an adder 430, which adds the previous data element of v1 (determined by the selector 450) and a data element of v3 for the current loop index. The mask data element (e.g., a mask bit) for the current loop index is used to control a multiplexer 420. If the mask bit is true, the output of the adder 430 is written into v1. If the mask bit is false, the output of the multiplexer 410 is written into v1.

Although only the addition operation is described in the above examples, it is appreciated that the new vector reduction instructions may specify other associative reduction operations (some of which are also commutative) that include multiply, bit-wise AND, bit-wise OR, MIN, MAX and other arithmetic or logical operators. The adder 430 may be replaced by a different arithmetic or logical unit for performing a different arithmetic or logical operation. The hardware unit may be located in a processor, a core within a processor, an execution unit within a core, or may be implemented by special-purpose hardware circuitry.

FIG. 5 is a flow diagram of a method 500 for executing a vector reduction instruction according to one embodiment. The vector reduction instruction specifies source operands that include a first vector register, a second vector register, a third vector register, a mask register and a stride distance. In one embodiment, the destination operand is the first vector register. In an alternative embodiment, the destination operand may be a different vector register. The method 500 begins when a processor (more specifically, execution circuitry such as an execution engine unit 750 of FIG. 7B) receives a vector reduction instruction to perform an associative reduction operation on data elements of the first vector register (block 510). Based on values of the mask register and a current element position ("position P," which for example may be a loop index) being processed, the processor sequentially sets one or more data elements of the first vector register to a result, which is generated by the associative reduction operation applied to both a previous data element of the first vector register and a data element of a third vector register, where the previous data element is located more than one element position away from position P (block 520).

In one embodiment, when the mask value (e.g., a mask bit) at position P is false, the processor may, depending on the value or position P, set the data element of the first vector register at position P to the value of the data element of the second vector register at position P, or keep the data element of the first vector register at position P without change.

In one embodiment, when a mask value at position P is true, the processor may set the data element of the first vector register at position P to the result, which is generated by the associative reduction operation applied to both a previous data element of the first vector register and a data element of a third vector register. The previous data element is located at position P minus the stride distance modulo a vector length of the first vector register.

In various embodiments, the method of FIG. 5 may be performed by a general-purpose processor, a special-purpose processor (e.g., a graphics processor or a digital signal processor), or another type of digital logic device or instruction processing apparatus. In some embodiments, the method of FIG. 5 may be performed by a processor, apparatus, or system, such as the embodiments shown in FIGS. 7A-B, 8A-B and 9-13. Moreover, the processor, apparatus, or system shown in FIGS. 7A-B, 8A-B and 9-13 may perform embodiments of operations and methods either the same as, similar to, or different than those of the method of FIG. 5.

In some embodiments, the processor, apparatus, or system of FIGS. 7A-B, 8A-B and 9-13 may operate in conjunction with an instruction converter that converts an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 6 is a block diagram contrasting the use of a software instruction converter according to embodiments of the invention. In the illustrated embodiment, the instruction converter is a software instruction converter, although alternatively the instruction converter may be implemented in software, firmware, hardware, or various combinations thereof. FIG. 6 shows a program in a high level language 602 may be compiled using an x86 compiler 604 to generate x86 binary code 606 that may be natively executed by a processor with at least one x86 instruction set core 616. The processor with at least one x86 instruction set core 616 represents any processor that can perform substantially the same functions as an Intel processor with at least one x86 instruction set core by compatibly executing or otherwise processing (1) a substantial portion or the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 604 represents a compiler that is operable to generate x86 binary code 606 (e.g., object code) that can, with or without additional linkage processing, be executed on the processor with at least one x86 instruction set core 616. Similarly, FIG. 6 shows the program in the high level language 602 may be compiled using an alternative instruction set compiler 608 to generate alternative instruction set binary code 610 that may be natively executed by a processor without at least one x86 instruction set core 614 (e.g., a processor with cores that execute the MIPS instruction set of MIPS Technologies of Sunnyvale, Calif. and/or that execute the ARM instruction set of ARM Holdings of Sunnyvale, Calif.). The instruction converter 612 is used to convert the x86 binary code 606 into code that may be natively executed by the processor without an x86 instruction set core 614. This converted code is not likely to be the same as the alternative instruction set binary code 610 because an instruction converter capable of this is difficult to make; however, the converted code will accomplish the general operation and be made up of instructions from the alternative instruction set. Thus, the instruction converter 612 represents software, firmware, hardware, or a combination thereof that, through emulation, simulation or any other process, allows a processor or other electronic device that does not have an x86 instruction set processor or core to execute the x86 binary code 606.

Exemplary Core Architectures

In-Order and Out-Of-Order Core Block Diagram

FIG. 7A is a block diagram illustrating both an exemplary in-order pipeline and an exemplary register renaming, out-of-order issue/execution pipeline according to embodiments of the invention. FIG. 7B is a block diagram illustrating both an exemplary embodiment of an in-order architecture core and an exemplary register renaming, out-of-order issue/execution architecture core to be included in a processor according to embodiments of the invention. The solid lined boxes in FIGS. 7A and 7B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 7A, a processor pipeline 700 includes a fetch stage 702, a length decode stage 704, a decode stage 706, an allocation stage 708, a renaming stage 710, a scheduling (also known as a dispatch or issue) stage 712, a register read/memory read stage 714, an execute stage 716, a write back/memory write stage 718, an exception handling stage 722, and a commit stage 724.

FIG. 7B shows processor core 790 including a front end unit 730 coupled to an execution engine unit 750, and both are coupled to a memory unit 770. The core 790 may be a reduced instruction set computing (RISC) core, a complex instruction set computing (CISC) core, a very long instruction word (VLIW) core, or a hybrid or alternative core type. As yet another option, the core 790 may be a special-purpose core, such as, for example, a network or communication core, compression engine, coprocessor core, general purpose computing graphics processing unit (GPGPU) core, graphics core, or the like.

The front end unit 730 includes a branch prediction unit 732 coupled to an instruction cache unit 734, which is coupled to an instruction translation lookaside buffer (TLB) 736, which is coupled to an instruction fetch unit 738, which is coupled to a decode unit 740. The decode unit 740 (or decoder) may decode instructions, and generate as an output one or more micro-operations, micro-code entry points, microinstructions, other instructions, or other control signals, which are decoded from, or which otherwise reflect, or are derived from, the original instructions. The decode unit 740 may be implemented using various different mechanisms. Examples of suitable mechanisms include, but are not limited to, look-up tables, hardware implementations, programmable logic arrays (PLAs), microcode read only memories (ROMs), etc. In one embodiment, the core 790 includes a microcode ROM or other medium that stores microcode for certain macroinstructions (e.g., in decode unit 740 or otherwise within the front end unit 730). The decode unit 740 is coupled to a rename/allocator unit 752 in the execution engine unit 750.

The execution engine unit 750 includes the rename/allocator unit 752 coupled to a retirement unit 754 and a set of one or more scheduler unit(s) 756. The scheduler unit(s) 756 represents any number or different schedulers, including reservations stations, central instruction window, etc. The scheduler unit(s) 756 is coupled to the physical register file(s) unit(s) 758. Each of the physical register file(s) units 758 represents one or more physical register files, different ones of which store one or more different data types, such as scalar integer, scalar floating point, packed integer, packed floating point, vector integer, vector floating point, status (e.g., an instruction pointer that is the address of the next instruction to he executed), etc. In one embodiment, the physical register file(s) unit 758 comprises a vector registers unit, a write mask registers unit, and a scalar registers unit. These register units may provide architectural vector registers, vector mask registers, and general purpose registers. The physical register file(s) unit(s) 758 is overlapped by the retirement unit 754 to illustrate various ways in which register renaming and out-of-order execution may be implemented (e.g., using a reorder buffer(s) and a retirement register file(s); using a future file(s), a history buffer(s), and a retirement register file(s); using a register map and a pool of registers; etc.). The retirement unit 754 and the physical register file(s) unit(s) 758 are coupled to the execution cluster(s) 760. The execution cluster(s) 760 includes a set of one or more execution units 762 and a set of one or more memory access units 764. The execution units 762 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 756, physical register file(s) unit(s) 758, and execution cluster(s) 760 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster and in the case of a separate memory access pipeline, certain embodiments are implemented in which only the execution cluster of this pipeline has the memory access unit(s) 764). It should also be understood that where separate pipelines are used, one or more of these pipelines may be out-of-order issue/execution and the rest in-order.

The set of memory access units 764 is coupled to the memory unit 770, which includes a data TLB unit 772 coupled to a data cache unit 774 coupled to a level 2 (L2) cache unit 776. In one exemplary embodiment, the memory access units 764 may include a load unit, a store address unit, and a store data unit, each of which is coupled to the data TLB unit 772 in the memory unit 770. The instruction cache unit 734 is further coupled to a level 2 (L2) cache unit 776 in the memory unit 770. The L2 cache unit 776 is coupled to one or more other levels or cache and eventually to a main memory.

By way of example, the exemplary register renaming, out-of-order issue/execution core architecture may implement the pipeline 700 as follows: 1) the instruction fetch 738 performs the fetch and length decoding stages 702 and 704; 2) the decode unit 740 performs the decode stage 706; 3) the rename/allocator unit 752 performs the allocation stage 708 and renaming stage 710: 4) the scheduler unit(s) 756 performs the schedule stage 712; 5) the physical register file(s) unit(s) 758 and the memory unit 770 perform the register read/memory read stage 714: the execution cluster 760 perform the execute stage 716; 6) the memory unit 770 and the physical register file(s) (unit(s) 758 perform the write back/memory write stage 718: 7) various units may be involved in the exception handling stage 722; and 8) the retirement unit 754 and the physical register file(s) unit(s) 758 perform the commit stage 724.

The core 790 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 790 includes logic to support a packed data instruction set extension (e.g., SSE, AVX1, AVX2, etc.), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 734/774 and a shared L2 cache unit 776, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figure 8B:
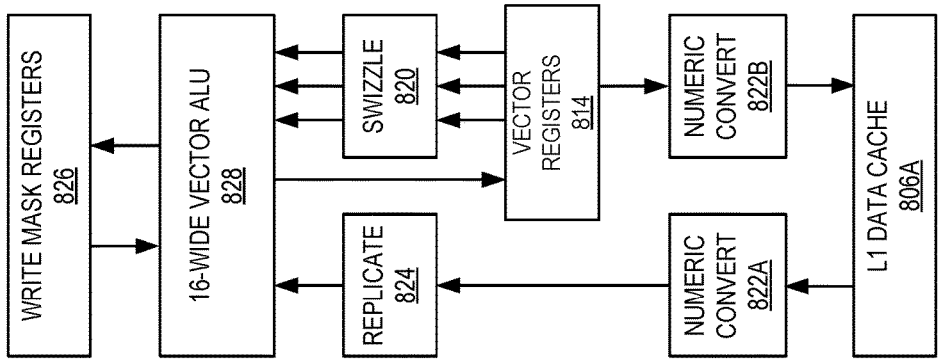
FIGS. 8A-8B are block diagrams of a more specific exemplary in-order core architecture according to one embodiment.
Figure 8A:
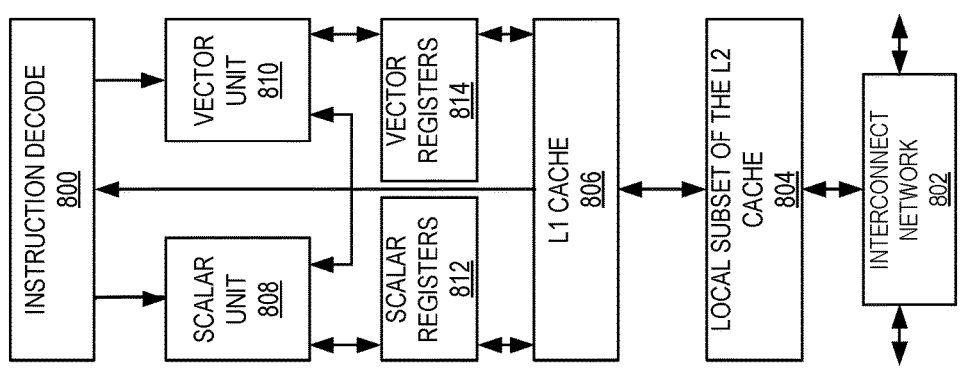

FIGS. 8A-8B illustrate a block diagram specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 8A is a block diagram of a single processor core, along connection to the on-die interconnect network 802 and with its local subset of the Level 2 (L2) cache 804, according to embodiments of the invention. In one embodiment, an instruction decoder 800 supports the x86 instruction set with a packed data instruction set extension. An L1 cache 806 allows low-latency accesses to cache memory into the scalar and vector units. While in one embodiment (to simplify the design), a scalar unit 808 and a vector unit 810 use separate register sets (respectively, scalar registers 812 and vector registers 814) and data transferred between them is written to memory and then read back in from a level 1 (L1) cache 806, alternative embodiments of the invention may use a different approach (e.g., use a single register set or include a communication path that allow data to be transferred between the two register files without being written and read back).

The local subset of the L2 cache 804 is part of a global L2 cache that is divided into separate local subsets, one per processor core. Each processor core has a direct access path to its own local subset of the L2 cache 804. Data read by a processor core is stored in its L2 cache subset 804 and can be accessed quickly, in parallel with other processor cores accessing their own local L2 cache subsets. Data written by a processor core is stored in its own L2 cache subset 804 and is flushed from other subsets, if necessary. The ring network ensures coherency for shared data. The ring network is bi-directional to allow agents such as processor cores, L2 caches and other logic blocks to communicate with each other within the chip.

FIG. 8B is an expanded view of part of the processor core in FIG. 8A according to embodiments of the invention. FIG. 8B includes an L1 data cache 806A part of the L1 cache 806, as well as more detail regarding the vector unit 810 and the vector registers 814. Specifically, the vector unit 810 is a 16-wide vector processing unit (VPU) (see the 16-wide ALU 828), which executes one or more of integer, single-precision float, and double-precision float instructions. The VPU supports swizzling the register inputs with swizzle unit 820, numeric conversion with numeric convert units 822A-B, and replication with replication unit 824 on the memory input. Write mask registers 826 allow predicating resulting vector writes.

Processor with Integrated Memory Controller and Graphics

Figure 9:
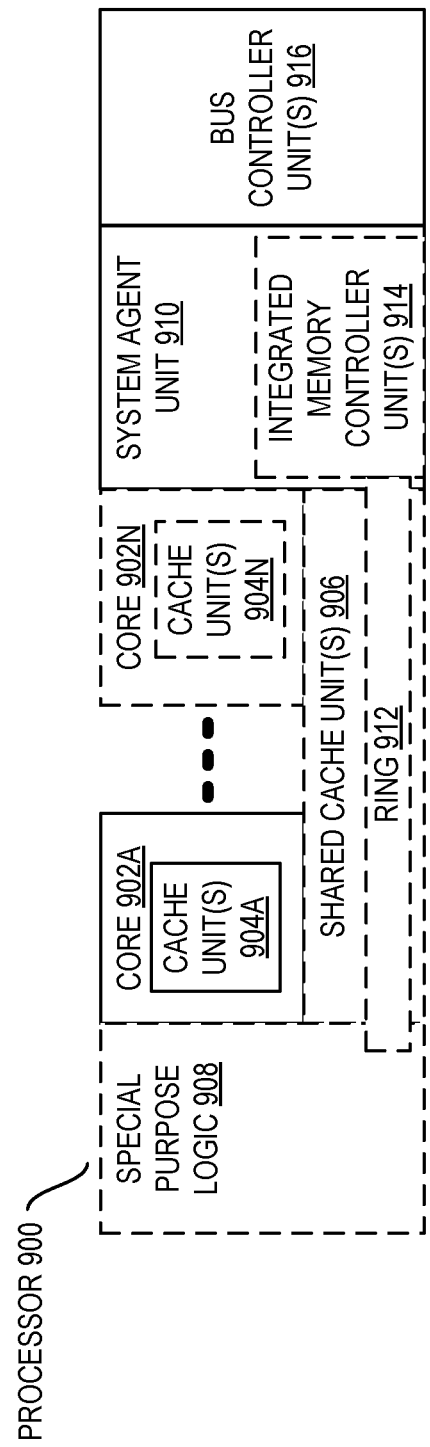
FIG. 9 is a block diagram of a processor according to one embodiment.

FIG. 9 is a block diagram of a processor 900 that may have more than one core, may have an integrated memory controller, and may have integrated graphics according to embodiments of the invention. The solid lined boxes in FIG. 9 illustrate a processor 900 with a single core 902A, a system agent 910, a set of one or more bus controller units 916, while the optional addition of the dashed lined boxes illustrates an alternative processor 900 with multiple cores 902A-N, a set of one or more integrated memory controller unit(s) 914 in the system agent unit 910, and special purpose logic 908.

Thus, different implementations of the processor 900 may include: 1) a CPU with the special purpose logic 908 being integrated graphics and/or scientific (throughput) logic (which may include one or more cores), and the cores 902A-N being one or more general purpose cores (e.g., general purpose in-order cores, general purpose out-of-order cores, a combination of the two); 2) a coprocessor with the cores 902A-N being a large number of special purpose cores intended primarily for graphics and/or scientific (throughput) and 3) a coprocessor with the cores 902A-N being a large number of general purpose in-order cores. Thus, the processor 900 may be a general-purpose processor, coprocessor or special-purpose processor, such as for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 900 may be apart of and/or may be implemented on one or more substrates using any of a number of process technologies, such as, for example, BiCMOS, CMOS, or NMOS.

The memory hierarchy includes one or more levels of cache 904A-N within the cores, a set or one or more shared cache units 906, and external memory (not shown) coupled to the set of integrated memory controller units 914. The set of shared cache units 906 may include one or more mid-level caches, such as level 2 (L2), level 3 (L3), level 4 (L4), or other levels of cache, a last level cache (LLC), and/or combinations thereof. While in one embodiment a ring based interconnect unit 912 interconnects the integrated graphics logic 908 (integrated graphics logic 908 is an example of and is also referred to herein as special purpose logic), the set of shared cache units 906, and the system agent unit 910/integrated memory controller unit(s) 914, alternative embodiments may use any number of well-known techniques for interconnecting such units. In one embodiment, coherency is maintained between one or more cache units 906 and cores 902A-N.

In some embodiments, one or more of the cores 902A-N are capable of multi-threading. The system agent 910 includes those components coordinating and operating cores 902A-N. The system agent unit 910 may include for example a power control unit (PCU) and a display unit. The PCU may be or include logic and components needed for regulating the power state of the cores 902A-N and the integrated graphics logic 908. The display unit is for driving one or more externally connected displays.

The cores 902A-N may be homogenous or heterogeneous in terms of architecture instruction set; that is, two or more of the cores 902A-N may be capable of executing the same instruction set, while others may be capable of executing only a subset of that instruction set or a different instruction set.

Exemplary Computer Architectures

FIGS. 10-13 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 10:
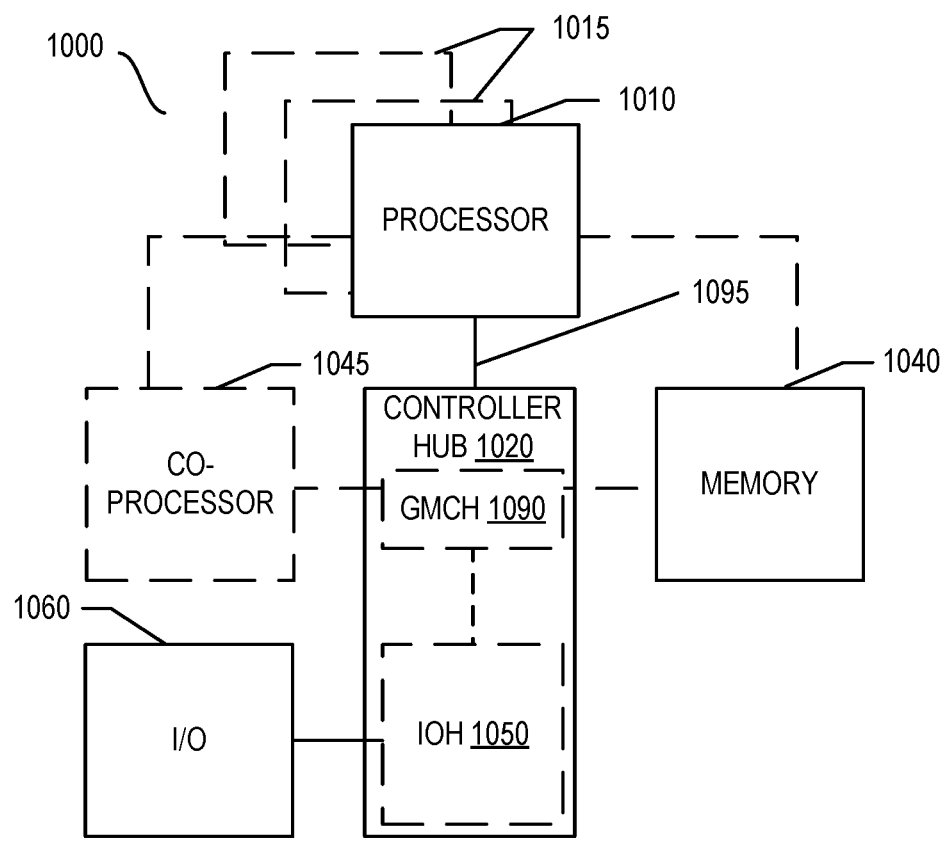
FIG. 10 is a block diagram of a system in accordance with one embodiment.

Referring now to FIG. 10, shown is a block diagram of a system 1000 in accordance with one embodiment of the present invention. The system 1000 may include one or more processors 1010, 1015, which are coupled to a controller hub 1020. In one embodiment controller hub 1020 includes a graphics memory controller hub (GMCH) 1090 and an Input/Output Hub (IOH) 1050 (which may be on separate chips); the GMCH 1090 includes memory and graphics controllers to which are coupled memory 1040 and a coprocessor 1045; the IOH 1050 couples input/output (I/O) devices 1060 to the GMCH 1090. Alternatively, one or both of the memory and graphics controllers are integrated within the processor (as described herein), the memory 1040 and the coprocessor 1045 are coupled directly to the processor 1010, and the controller hub 1020 in a single chip with the IOH 1050.

The optional nature of additional processors 1015 is denoted in FIG. 10 with broken lines. Each processor 1010, 1015 may include one or more of the processor cores described herein and may be some version of the processor 900.

The memory 1040 may be, for example, dynamic random access memory (DRAM), phase change memory (PCM), or a combination of the two. For at least one embodiment, the controller hub 1020 communicates with the processor(s) 1010, 1015 via a multi-drop bus, such as a frontside bus (FSB), point-to-point interface such as QuickPath Interconnect (QPI), or similar connection 1095.

In one embodiment, the coprocessor 1045 is a special-purpose processor, such as, for example, a high-throughput MIC processor, a network or communication processor, compression engine, graphics processor, GPGPU, embedded processor, or the like. In one embodiment, controller hub 1020 may include an integrated graphics accelerator.

There can be a variety of differences between the processors 1010, 1015 in terms of a spectrum of metrics of merit including architectural, micro-architectural thermal, power consumption characteristics, and the like.

In one embodiment, the processor 1010 executes instructions that control data processing operations of a general type. Embedded within the instructions may be coprocessor instructions. The processor 1010 recognizes these coprocessor instructions as being of a type that should be executed by the attached coprocessor 1045. Accordingly, the processor 1010 issues these coprocessor instructions (or control signals representing coprocessor instructions) on a coprocessor bus or other interconnect, to coprocessor 1045. Coprocessor(s) 1045 accept and execute the received coprocessor instructions.

Figure 11:
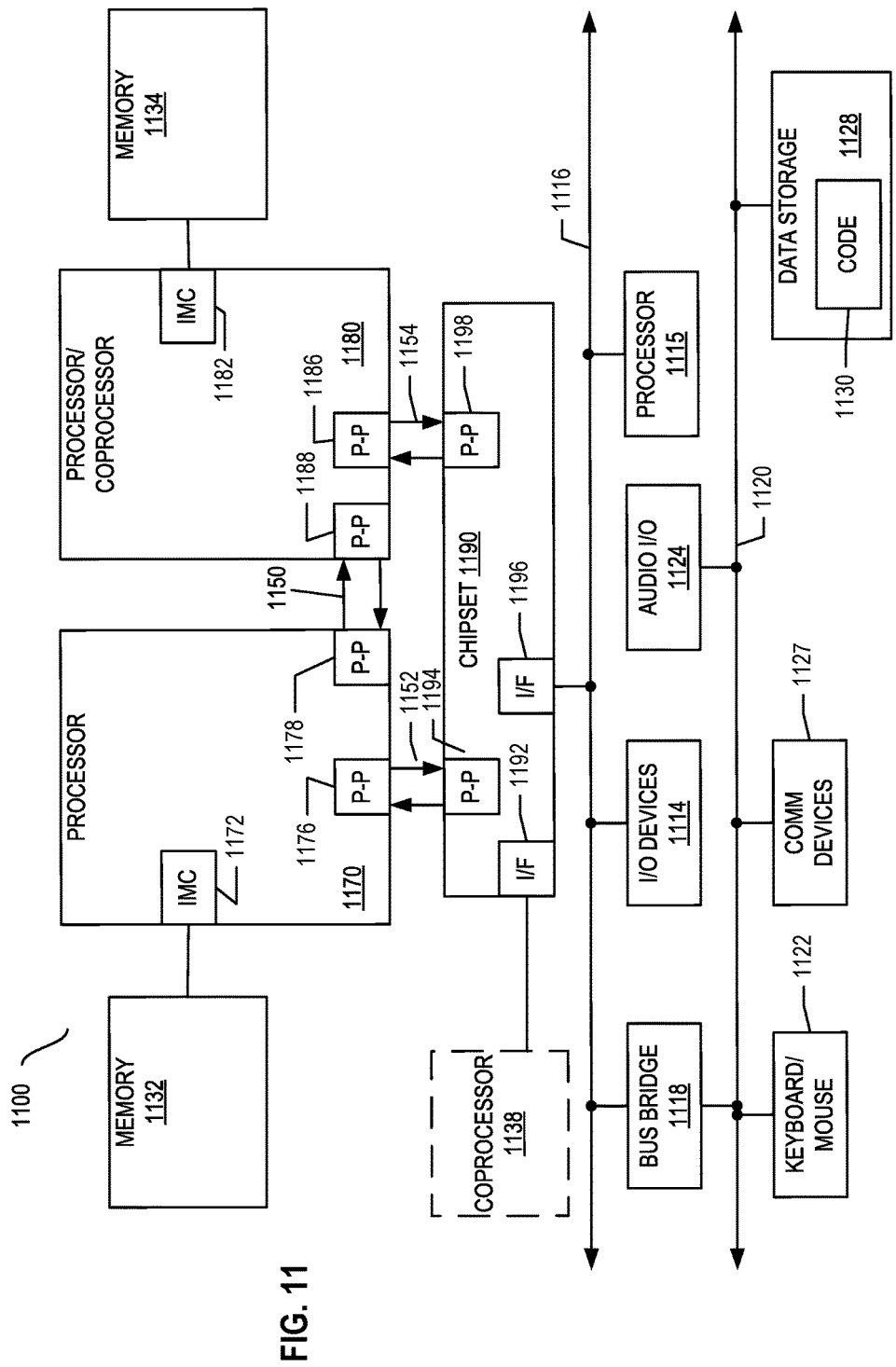
FIG. 11 is a block diagram of a second system in accordance with one embodiment.

Referring now to FIG. 11, shown is a block diagram of a first more specific exemplary system 1100 in accordance with an embodiment of the present invention. As shown in FIG. 11, multiprocessor system 1100 is a point-to-point interconnect system, and includes a first processor 1170 and a second processor 1180 coupled via a point-to-point interconnect 1150. Each of processors 1170 and 1180 may be some version of the processor 900. In one embodiment of the invention, processors 1170 and 1180 are respectively processors 1010 and 1015, while coprocessor 1138 is coprocessor 1045. In another embodiment, processors 1170 and 1180 are respectively processor 1010 and coprocessor 1045.

Processors 1170 and 1180 are shown including integrated memory controller (IMC) units 1172 and 1182, respectively. Processor 1170 also includes as part of its bus controller units point-to-point (P-P) interfaces 1176 and 1178; similarly, second processor 1180 includes P-P interfaces 1186 and 1188. Processors 1170, 1180 may exchange information via a point-to-point (P-P) interface 1150 using P-P interface circuits 1178, 1188. As shown in FIG. 11, IMCs 1172 and 1182 couple the processors to respective memories, namely a memory 1132 and a memory 1134, which may be portions of main memory locally attached to the respective processors.

Processors 1170, 1180 may each exchange information with a chipset 1190 via individual P-P interfaces 1152, 1154 using point to point interface circuits 1176, 1194, 1186, 1198. Chipset 1190 may optionally exchange information with the coprocessor 1138 via a high-performance interface 1192. In one embodiment, the coprocessor 1138 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1190 may be coupled to a first bus 1116 via an interface 1196. In one embodiment, first bus 1116 may be a Peripheral Component Interconnect (PCI) bus, or a bus such as a PCI Express bus or another third generation I/O interconnect bus, although the scope of the present invention is not so limited.

As shown in FIG. 11, various I/O devices 1114 may be coupled to first bus 1116, along with a bus bridge 1118 which couples first bus 1116 to a second bus 1120. In one embodiment, one or more additional processor(s) 1115, such as coprocessors, high-throughput MIC processors. GPGPU's, accelerators (such as, e.g., graphics accelerators or digital signal processing (DSP) units), field programmable gate arrays, or any other processor, are coupled to first bus 1116. In one embodiment, second bus 1120 may be a low pin count (LPC) bus. Various devices may be coupled to a second bus 1120 including, for example, a keyboard and/or mouse 1122, communication devices 1127 and a storage unit 1128 such as a disk drive or other mass storage device which may include instructions/code and data 1130, in one embodiment. Further, an audio I/O 1124 may be coupled to the second bus 1120. Note that other architectures are possible. For example, instead of the point-to-point architecture of FIG. 11, a system may implement a multi-drop bus or other such architecture.

Figure 12:
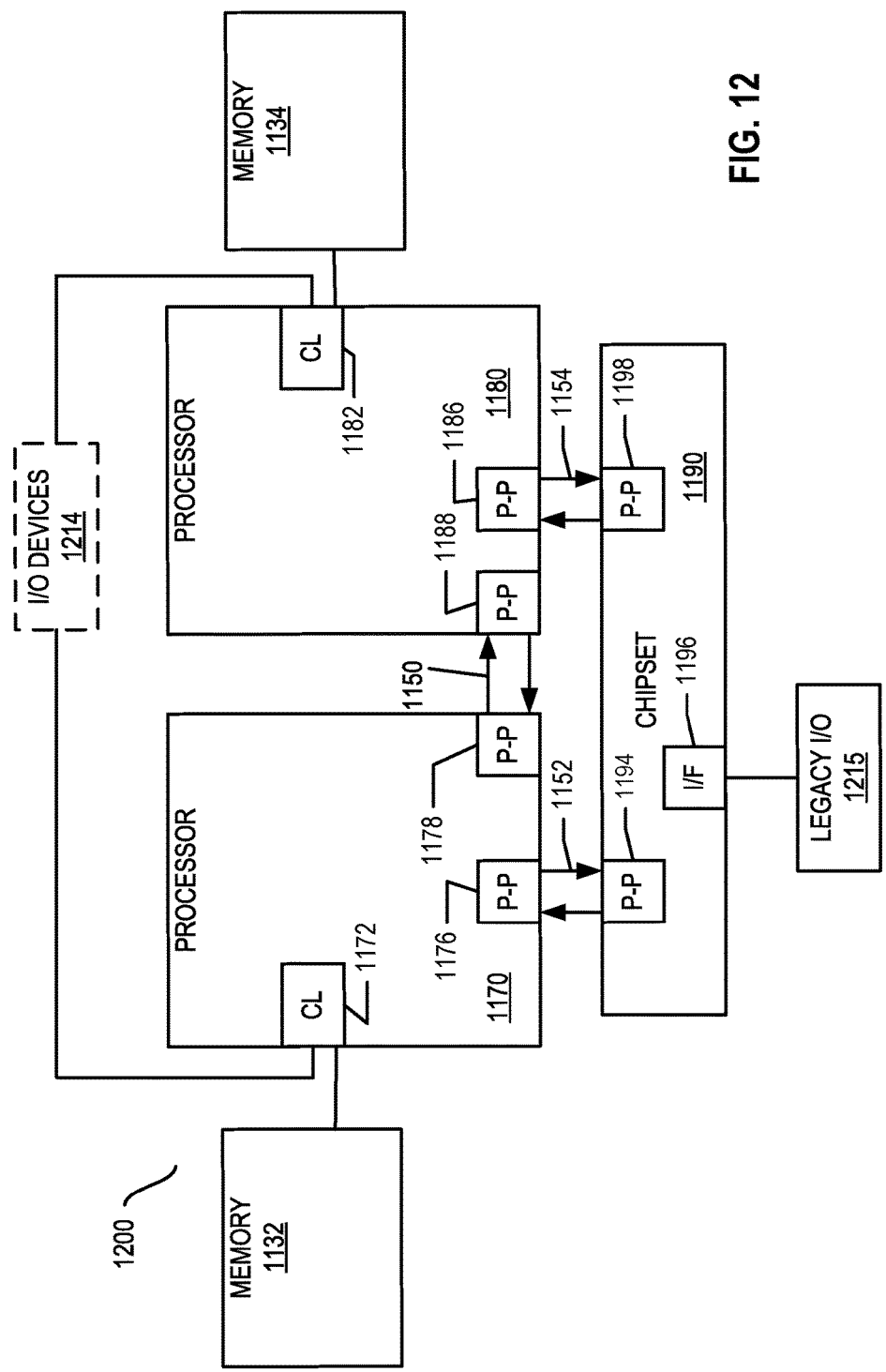
FIG. 12 is a block diagram of a third system in accordance with an embodiment of invention.

Referring now to FIG. 12, shown is a block diagram of a second more specific exemplary system 1200 in accordance with an embodiment of the present invention. Like elements in FIGS. 11 and 12 bear like reference numerals, and certain aspects of FIG. 11 have been omitted from FIG. 12 in order to avoid obscuring other aspects of FIG. 12.

FIG. 12 illustrates that the processors 1170, 1180 may include integrated memory and I/O control logic ("CL") 1172 and 1182, respectively. Thus, the CL 1172, 1182 include integrated memory controller units and include I/O control logic. FIG. 12 illustrates that not only are the memories 1132, 1134 coupled to the CL 1172, 1182, but also that I/O devices 1214 are also coupled to the control logic 1172, 1182. Legacy I/O devices 1215 are coupled to the chipset 1190.

Figure 13:
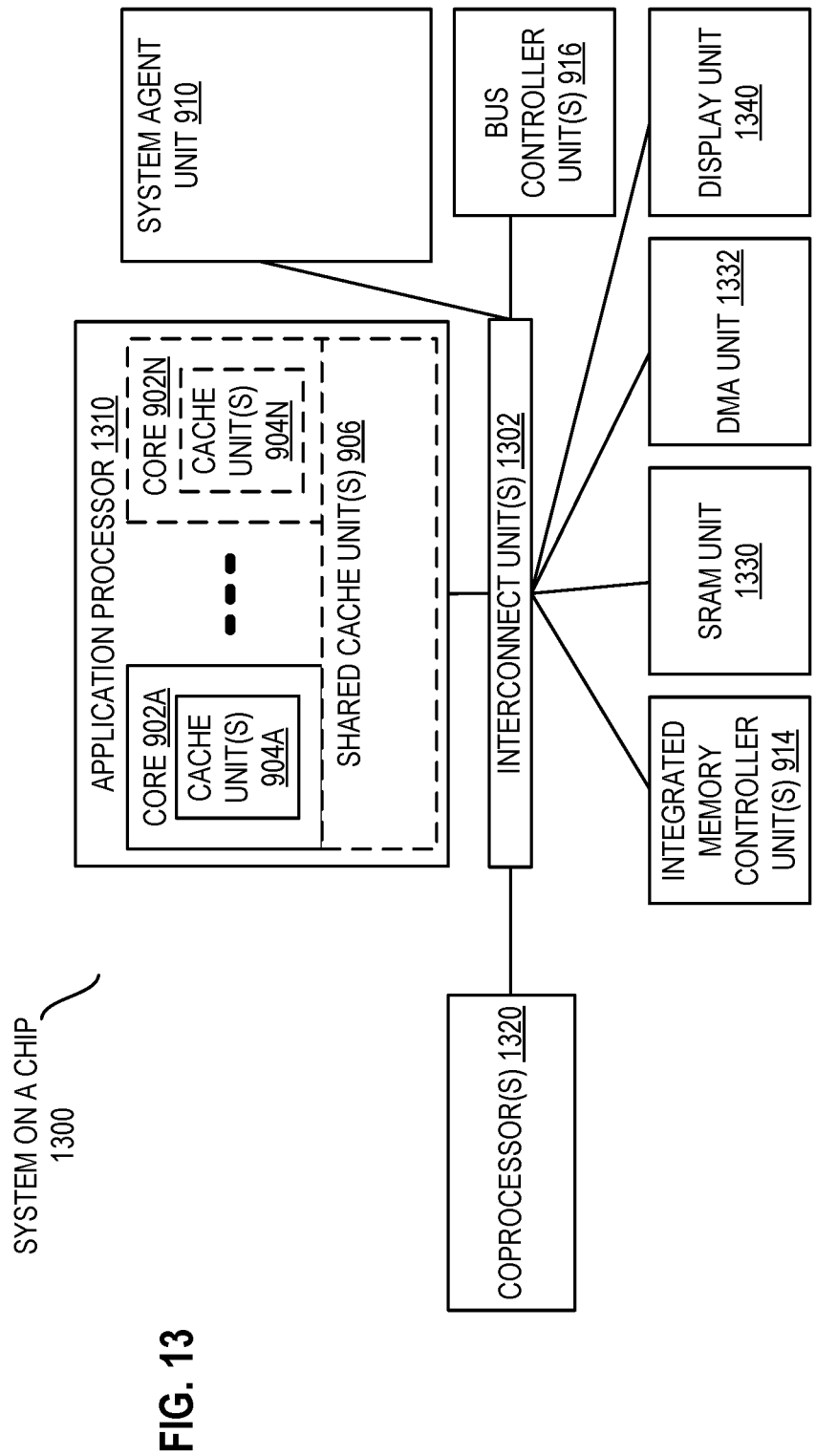
FIG. 13 is a block diagram of a system-on-a-chip (SoC) in accordance with one embodiment.

Referring now to FIG. 13, shown is a block diagram of a SoC 1300 in accordance with an embodiment of the present invention. Similar elements in FIG. 9 bear like reference numerals. Also, dashed lined boxes are optional features on more advanced SoCs. In FIG. 13, an interconnect unit(s) 1302 is coupled to: an application processor 1310 which includes a set of one or more cores 902A-N and shared cache unit(s) 906; a system agent unit 910; a bus controller unit(s) 916; an integrated memory controller unit(s) 914; a set or one or more coprocessors 1320 which may include integrated graphics logic, an image processor, an audio processor, and a video processor; a static random access memory (SRAM) unit 1330; a direct memory access (DMA) unit 1332; and a display unit 1340 coupling to one or more external displays. In one embodiment, the coprocessor(s) 1320 include a special-purpose processor, such as, for example, a network or communication processor, compression engine. GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such code 1130 illustrated in FIG. 11, may be applied to input instructions to perform the functions described herein and generate output information. The output information may be applied to one or more output devices, in known fashion. For purposes of this application, a processing system includes any system that has a processor, such as for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principles of the present disclosure or the scope of the accompanying claims.

What is claimed is:

1. An apparatus comprising:
   a mask register and a plurality of vector registers including a first vector register, a second vector register, and a third vector register, wherein the mask register comprises a plurality of bits, each bit to enable a conditional update of a corresponding vector register element to proceed; and
   execution circuitry coupled to the plurality of vector registers and the mask register, the execution circuitry operative to:
      receive an associative vector reduction instruction to perform an associative reduction operation on data elements of the first vector register; and
      based on values of the mask register and a current element position being processed, sequentially set enabled data elements of the first vector register to a result, each of the results being generated by the associative reduction operation applied to both a previous data element of the first vector register and a data element of the third vector register, wherein the previous data element is located more than one element position away from the current element position;

wherein the associative vector reduction instruction specifies a source operand that further specifies a stride distance between the previous data element and the current element position.

2. The apparatus of claim 1, wherein, when a mask value in the current element position being processed is false, the execution circuitry, depending on the current element position, is further operative to set a data element of the data elements of the first vector register in the current element position to a data element of the second vector register in the current element position, or keep the data element of the first vector register in the current element position without change.

3. The apparatus of claim 1, wherein, when a mask value in the current element position is true, the execution circuitry is operative to set the data element of the first vector register in the current element position to the result.

4. The apparatus of claim 1, wherein the previous data element of the first vector register is located at the current element position minus the stride distance modulo a vector length of the first vector register.

5. The apparatus of claim 1, wherein, in response to the source operand specifying the stride distance as being greater than a vector length of the first vector register, the execution circuitry is operative to perform the associative reduction operation in parallel on the data elements of the first vector register.

6. The apparatus of claim 1, wherein the associative reduction operation includes one of the following:
add, multiply, bit-wise AND, bit-wise OR, MIN or MAX.

7. A method comprising:
receiving by execution circuitry an associative vector reduction instruction, including a mask register identifier, to perform an associative vector reduction operation on data elements of a first vector register, wherein the identified mask register comprises a plurality of bits, each bit to enable a conditional update of a corresponding vector register element to proceed; and
based on values of the identified mask register and a current element position being processed, sequentially setting enabled data elements of the first vector register to a result, each of the results being generated by the associative vector reduction operation applied to both a previous data element of the first vector register and a data element of a third vector register, wherein the previous data element is located more than one element position away from the current element position;
wherein the associative vector reduction instruction specifies a source operand that further specifies a stride distance between the previous data element and the current element position.

8. The method of claim 7, wherein, when a mask value in the current element position is false, the method further comprises:
depending on the current element position, setting a data element of the first vector register in the current element position to a data element of a second vector register in the current element position, or keep the data element of the first vector register in the current element position without change.

9. The method of claim 8, wherein the first vector register stores a vector that is left-shifted with wrap-around by the stride distance, and the second vector register stores the vector that is left-shifted without wrap-around by the stride distance.

10. The method of claim 7, wherein, when a mask value in the current element position is true, the method comprises:
setting the data element of the first vector register in the current element position to the result.

11. The method of claim 7, wherein the previous data element of the first vector register is located at the current element position minus the stride distance modulo a vector length of the first vector register.

12. The method of claim 7, further comprising:
in response to the source operand specifying the stride distance as being greater than a vector length of the first vector register, performing the associative vector reduction operation in parallel on the data elements of the first vector register.

13. The method of claim 7, wherein the associative vector reduction includes one of the following:
add, multiply, bit-wise AND, bit-wise OR, MIN or MAX.

14. A system comprising:
a memory; and
a processor coupled to the memory, the processor comprising:
a plurality of vector registers including a first vector register, a second vector register, and a third vector register;
a mask register, wherein the mask register comprises a plurality of bits, each bit to enable a conditional update of a corresponding vector register element to proceed; and
execution circuitry coupled to the plurality of vector registers and the mask register, the execution circuitry operative to:
receive an associative vector reduction instruction to perform an associative reduction operation on data elements of the first vector register; and
based on values of the mask register and a current element position being processed, sequentially set enabled data elements of the first vector register to a result, each of the results being generated by the associative reduction operation applied to both a previous data element of the first vector register and a data element of the third vector register, wherein the previous data element is located more than one element position away from the current element position;
wherein the associative vector reduction instruction specifies a source operand that further specifies a stride distance between the previous data element and the current element position.

15. The system of claim 14, wherein, when a mask value in the current element position is false, the execution circuitry depending on the current element position is further operative to set a data element of the first vector register in the current element position to a data element of the second vector register in the current element position, or keep the data element of the first vector register in the current element position without change.

16. The system of claim 14, wherein, when a mask value in the current element position is true, the execution circuitry is operative to set the data element of the first vector register in the current element position to the result.

17. The system of claim 14, wherein the associative reduction operation includes one of the following:
add, multiply, bit-wise AND, bit-wise OR, MIN or MAX.

* * * * *